(12) United States Patent
Wang et al.

(10) Patent No.: US 10,302,832 B2
(45) Date of Patent: May 28, 2019

(54) EMBEDDED WIRE GRID POLARIZER WITH HIGH REFLECTIVITY ON BOTH SIDES

(71) Applicant: Moxtek, Inc., Orem, UT (US)

(72) Inventors: Bin Wang, Sandy, UT (US); Hua Li, Sandy, UT (US); Brian Bowers, Kaysville, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

(21) Appl. No.: 16/163,284

(22) Filed: Oct. 17, 2018

(65) Prior Publication Data

US 2019/0049646 A1 Feb. 14, 2019

Related U.S. Application Data

(62) Division of application No. 15/715,378, filed on Sep. 26, 2017, now Pat. No. 10,139,536.

(60) Provisional application No. 62/433,619, filed on Dec. 13, 2016, provisional application No. 62/425,201, filed on Nov. 22, 2016.

(51) Int. Cl.
*G02B 5/30* (2006.01)
*G02B 27/28* (2006.01)
*G02B 5/04* (2006.01)
*G02B 1/14* (2015.01)

(52) U.S. Cl.
CPC .......... *G02B 5/3058* (2013.01); *G02B 5/045* (2013.01); *G02B 5/3075* (2013.01); *G02B 27/283* (2013.01); *G02B 1/14* (2015.01)

(58) Field of Classification Search
CPC .............................. G02B 5/3058; G02B 27/283
USPC .......................... 359/485.05, 489.08, 489.09
See application file for complete search history.

(56) References Cited

U.S. PATENT DOCUMENTS

| | | |
|---|---|---|
| 6,288,840 B1 | 9/2001 | Perkins et al. |
| 6,447,120 B1 | 9/2002 | Hansen et al. |
| 6,585,378 B2 | 7/2003 | Kurtz et al. |
| 7,002,742 B2 | 2/2006 | Imaizumi et al. |
| 7,570,424 B2 | 8/2009 | Perkins et al. |
| 7,813,039 B2 | 10/2010 | Perkins et al. |
| 7,961,393 B2 | 6/2011 | Perkins et al. |
| 8,027,087 B2 * | 9/2011 | Perkins ............... G02B 5/3058 359/485.05 |
| 8,755,113 B2 | 6/2014 | Gardner et al. |
| 10,139,536 B2 * | 11/2018 | Wang ..................... G02B 5/045 |
| 2004/0218270 A1 | 11/2004 | Wang |
| 2005/0046943 A1 | 3/2005 | Suganuma |
| 2005/0277063 A1 | 12/2005 | Wang et al. |

(Continued)

*Primary Examiner* — Ricky D Shafer
(74) *Attorney, Agent, or Firm* — Thorpe, North & Western, LLP

(57) ABSTRACT

A wire grid polarizer (WGP) 10 can include wires 15 sandwiched between a first pair of thin-film layers 21 (with a first transparent layer 11 and a second transparent layer 12) and a second pair of thin-film layers 22 (with a third transparent layer 13 and a fourth transparent layer 14). An index of refraction of each outer transparent layer 11 and 14 can be greater than an index of refraction of the adjacent inner transparent layer 12 and 13, respectively. Material composition of the outer transparent layers 11 and 14 can be the same and material composition of the adjacent inner transparent layers 12 and 13 can be the same. There can be high reflection of one polarization (e.g. Rs1>93% and Rs2>93%) for light incident on either side of the WGP. The wires 15 can be embedded for protection.

20 Claims, 4 Drawing Sheets

(56) References Cited

U.S. PATENT DOCUMENTS

| | | |
|---|---|---|
| 2007/0152358 A1 | 7/2007 | Suganuma |
| 2007/0165307 A1 | 7/2007 | Perkins |
| 2007/0297052 A1 | 12/2007 | Wang et al. |
| 2008/0055719 A1 | 3/2008 | Perkins et al. |
| 2008/0316599 A1 | 12/2008 | Wang et al. |
| 2012/0008205 A1 | 1/2012 | Perkins et al. |
| 2012/0183739 A1 | 7/2012 | Kim et al. |
| 2016/0231487 A1 | 8/2016 | Wangensteen et al. |
| 2018/0052270 A1 | 2/2018 | Nielson et al. |
| 2018/0143365 A1 | 5/2018 | Nielson et al. |
| 2018/0143366 A1 | 5/2018 | Wang et al. |

\* cited by examiner

EMBEDDED WIRE GRID POLARIZER WITH HIGH REFLECTIVITY ON BOTH SIDES

CLAIM OF PRIORITY

This application is a divisional of U.S. Non provisional patent application Ser. No. 15/715,378, filed on Sep. 26, 2017, which claims priority to US Provisional Patent Application Nos. 62/425,201, filed on Nov. 22, 2016, and 62/433,619, filed on Dec. 13, 2016, which are incorporated herein by reference.

FIELD OF THE INVENTION

The present application is related generally to wire grid polarizers.

BACKGROUND

A wire grid polarizer (WGP) can transmit one polarization (e.g. p-polarization) and reflect or absorb an opposite polarization (e.g. s-polarization).

High reflectivity (e.g. high Rs) of the opposite polarization can be important because some applications use both polarized light beams (e.g. s & p). High absorption/low reflectivity (e.g. low Rs) of the opposite polarization can be important in some applications because reflection of this polarization (Rs) can interfere with the optical system. For example, the reflected s-polarization can cause ghosting in an image projector. Some WGPs are designed for high reflection and others for high absorption of the s-polarization.

High transmission (e.g. high Tp) of one polarization can be an important feature of WGPs in order to minimize light-source power requirements. Low transmission (e.g. Ts) of the opposite polarization can be important for improved light image resolution. The quality or performance of WGPs can be shown by efficiency (Tp*Rs) and contrast (Tp/Ts).

WGP wires, especially for polarization of visible or ultraviolet light, can be small and delicate with nanometer-sized pitch, wire-width, and wire-height. WGPs are used in systems (e.g. computer projectors, semiconductor inspection tools, etc.) that require high performance. Small defects in the WGP, such as collapsed wires can significantly degrade system performance (e.g. distorted image from a computer projector). Therefore, it can be important to protect the wires from damage.

SUMMARY

Some applications require high wire grid polarizer (WGP) performance on two opposite sides of the WGP. The present invention is directed to various embodiments of a WGP with high reflection (e.g. high Rs) of one polarization (e.g. s-polarization) on each of two opposite sides of the WGP. Wires of the WGP can be embedded for protection.

The WGP can comprise a transparent substrate having a first side, and a second side opposite of the first side. An array of wires can be located over the first side of the transparent substrate with channels between adjacent wires. A first pair of thin-film layers can be located between the array of wires and the transparent substrate; can be continuous, can span the channels; and can include a first transparent layer located closer to the transparent substrate and a second transparent layer located closer to the array of wires. A second pair of thin-film layers can be located at an opposite side of the array of wires from the transparent substrate; can be continuous and can span the channels; and can include a third transparent layer located closer to the array of wires and a fourth transparent layer located farther from the array of wires.

In one embodiment, for a wavelength range of at least 100 nm in the visible spectrum of light, an index of refraction of the first transparent layer (n1) can be greater than an index of refraction of the second transparent layer (n2) and an index of refraction of the fourth transparent layer (n4) can be greater than an index of refraction of the third transparent layer (n3).

In another embodiment, a material composition of the first transparent layer can be the same as a material composition of the fourth transparent layer; and a material composition of the second transparent layer can be the same as a material composition of the third transparent layer, but different from the material composition of the first transparent layer and the fourth transparent layer.

In another embodiment, a percent reflection (Rs1) of one polarization of incident light from a first side of the WGP can be greater than 93% and a percent reflection (Rs2) of one polarization of incident light from a second side of the WGP can be greater than 93%.

BRIEF DESCRIPTION OF THE DRAWINGS (DRAWINGS MIGHT NOT BE DRAWN TO SCALE)

FIG. 1 is a schematic, cross-sectional side-view of a wire grid polarizer (WGP) 10 comprising an array of wires 15 located over a transparent substrate 17 and sandwiched between a first pair of thin-film layers 21 (including a first transparent layer 11 and a second transparent layer 12) and a second pair of thin-film layers 22 (including a third transparent layer 13 and a fourth transparent layer 14), in accordance with an embodiment of the present invention.

FIG. 2 is a schematic perspective-view of a WGP 20, similar to the WGP 10 of FIG. 1, displayed without the first and the second pairs of thin-film layers 21 and 22 in order to clearly show the array of wires 15, in accordance with an embodiment of the present invention.

FIG. 3 is a schematic, cross-sectional side-view of a WGP 30, similar to WGP 10, except that the third transparent layer 13 extends into and fills channels 18 between the wires 15, in accordance with an embodiment of the present invention.

FIG. 4 is a schematic, cross-sectional side-view of a WGP 40, similar to WGPs 10 and 30, but further comprising third and fourth pairs of thin-film layers 43 and 44, in accordance with an embodiment of the present invention.

DEFINITIONS

Figure 1:
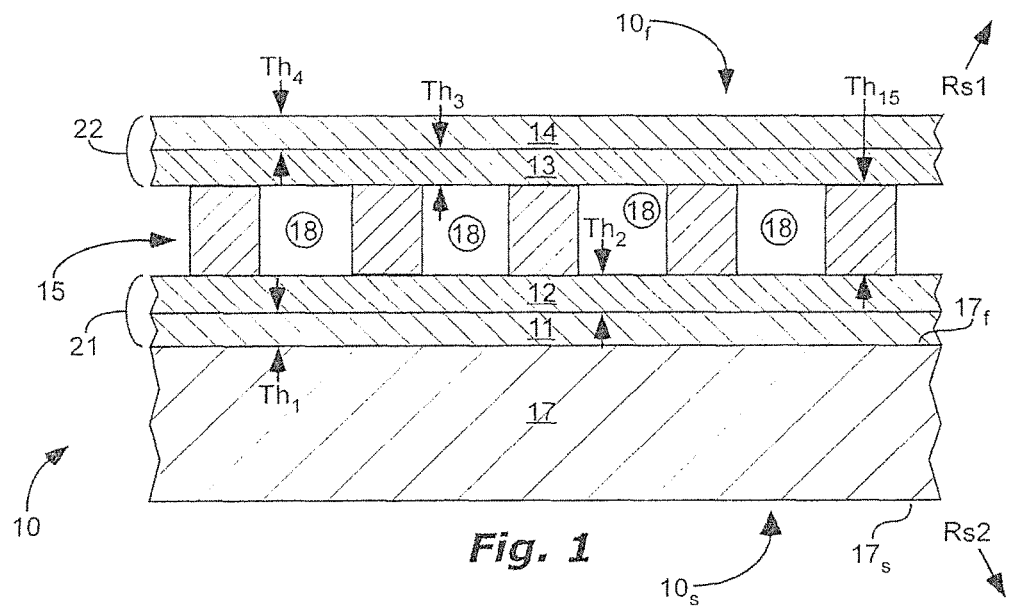
Figure 2:
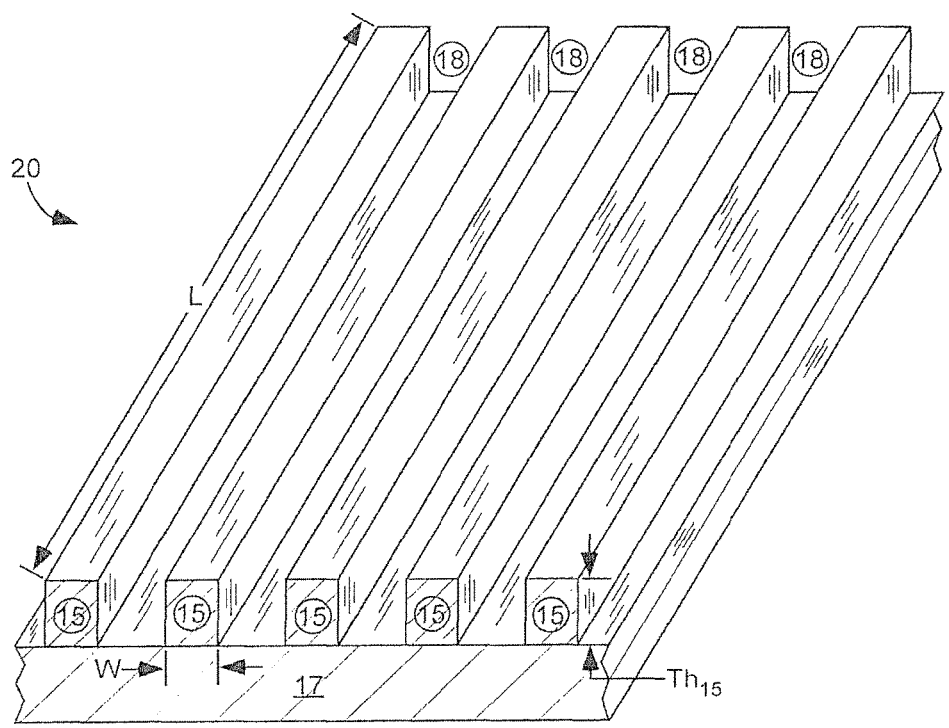

As used herein, the term "elongated" means that a length L of the wires 13 is substantially greater than wire width W or wire thickness $Th_{13}$ (e.g. L can be at least 10 times, at least 100 times, at least 1000 times, or at least 10,000 times larger than wire width W and/or wire thickness $Th_{13}$).

As used herein, the terms "fills channels" and "fill channels" mean completely fills, fills within normal manufacturing tolerances, or nearly completely fills, such that any deviation from completely fills would have negligible effect for ordinary use of the device.

As used herein, the term "light" can mean light or electromagnetic radiation in the x-ray, ultraviolet, visible, and/or infrared, or other regions of the electromagnetic spectrum.

As used herein, the terms "located on" or "located over" mean located directly on, or located above with some other solid material between; and the term "located directly on" means located above and adjoining with no other solid material between.

As used herein, the terms "located closest to" and "located farthest from" refer to the materials, layers, or structures mentioned, but there may be other solid material not mentioned that is located closer to or farther from.

As used herein, the term "nm" means nanometer(s).

As used herein, the term "parallel" means exactly parallel, parallel within normal manufacturing tolerances, or nearly parallel, such that any deviation from exactly parallel would have negligible effect for ordinary use of the device.

As used herein, the term "substrate" includes a base material, such as for example a glass wafer. The term "substrate" includes a single material, and also includes multiple materials, such as for example a glass wafer with at least one thin film on a surface of the wafer used together as the base material.

As used herein, the term "thin film" means a continuous layer that is not divided into a grid and having a thickness less than 10 μm, less than 1 μm, or less than 0.5 μm, depending on the light spectrum of interest.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a specific wavelength range (e.g. ultraviolet, visible, or infrared spectrum) and can have a different property in a different wavelength range. Such materials are divided into absorptive, reflective, and transparent based on reflectance R, the real part of the refractive index n, and the imaginary part of the refractive index/extinction coefficient k. Equation 1 is used to determine the reflectance R of the interface between air and a uniform slab of the material at normal incidence:

$$R = \frac{(n-1)^2 + k^2}{(n+1)^2 + k^2} \quad \text{Equation 1}$$

Unless explicitly specified otherwise herein, materials with k≤0.1 in the specified wavelength range are "transparent" materials, materials with k>0.1 and R≤0.6 in the specified wavelength range are "absorptive" materials, and materials with k>0.1 and R>0.6 in the specified wavelength range are "reflective" materials.

DETAILED DESCRIPTION

As illustrated in FIG. 1, a wire grid polarizer 10 (WGP) is shown comprising a transparent substrate 17 having a first side $17_f$ and a second side $17_s$ opposite of the first side $17_f$. An array of wires 15 can be located over the first side $17_f$ of the transparent substrate 17, with channels 18 between adjacent wires 15. The array of wires 15 can be reflective. The array of wires 15 can be parallel and elongated. The array of wires 15 can include a very large number of wires, such as for example >$10^3$, >$10^4$, or >$10^6$.

The array of wires 15 can be sandwiched between a first pair of thin-film layers 21 and second pair of thin-film layers 22. The first pair of thin-film layers 21 can be located between the array of wires 15 and the transparent substrate 17. The second pair of thin-film layers 22 can be located at an opposite side of the array of wires 15 from the transparent substrate 17.

The first pair of thin-film layers 21 and the second pair of thin-film layers 22 can be continuous (i.e. not divided into a grid like the wires 15) and can span the channels 18. The first pair of thin-film layers 21 can include a first transparent layer 11 and a second transparent layer 12. The first transparent layer 11 can be located closer to the transparent substrate 17 than the second transparent layer 12. The second pair of thin-film layers 22 can include a third transparent layer 13 and a fourth transparent layer 14. The third transparent layer 13 can be located closer to the array of wires 15 than the fourth transparent layer 14.

Although the materials of the transparent layers 11-14 are transparent, when combined with the wires 15 in the stack of layers, they can enhance reflection of one polarization (e.g. s-polarization) of the wires 15. Materials for the wires 15 (usually metals for visible light) and materials of the transparent layers 11-14 and 45-48 (e.g. dielectrics) are described in U.S. Pat. No. 7,961,393 and U.S. Pat. No. 8,755,113, which are incorporated herein by reference. The wires 15 and the transparent layers 11-14 and 45-48 can be solid materials.

The first transparent layer 11 can adjoin (i.e. directly contact) the transparent substrate 17 and/or can adjoin the second transparent layer 12; alternatively, there can be other layer(s) between the first transparent layer 11 and the transparent substrate 17 and/or the second transparent layer 12. The wires 15 can adjoin the third transparent layer 13 and/or the second transparent layer 12; alternatively, there can be other layer(s) between the wires 15 and the third transparent layer 13 and/or the second transparent layer 12. The fourth transparent layer 14 can adjoin the third transparent layer 13; or there can be other layer(s) between the fourth transparent layer 14 and the third transparent layer 13.

The channels 18 can be filled with air, a liquid, or vacuum. Alternatively, as shown on WGP 30 in FIG. 3, the third transparent layer 13 can extend into and can partially or completely fill the channels 18. For example, the third transparent layer 13 can fill at least 80%, at least 90%, at least 95%, or at least 99% of the channels 18.

Following are specific embodiments of the WGPs 10 and 30, including specific values of reflection of one polarization and a relationship between the indices of refraction of the transparent layers 11-14. The reflection of one polarization and the index of refraction vary with wavelength of incident light. Specified values below can relate to a specific wavelength range of light, such as for example a wavelength range of at least 100 nm in the visible spectrum of light, a wavelength range of at least 200 nm in the visible spectrum of light, or across one or more of the following spectrums of light: ultraviolet, visible, and infrared.

One polarization state (e.g. p-polarization) can primarily transmit through the WGPs 10 and 30 and an opposite polarization state (e.g. s-polarization) can primarily reflect off of the WGPs 10 and 30. By proper design of WGPs 10 and 30, the WGPs 10 and 30 can have a high reflection of one polarization (e.g. high Rs) for light incident on both the first side $17_f$ and the second side $17_s$ of the substrate 17.

Thus, WGPs 10 and 30 can be an effective polarizing beam splitter for light incident on either side.

For example, Rs1 and/or Rs2 can be >92%, >93%, >95%, or >97%. Rs1 is a percent reflection of s-polarized light from a first side $10_f$ of the WGP 10, 30, or 40. Rs2 is a percent reflection of s-polarized light from a second side $10_s$ of the WGP 10, 30, or 40. S-polarized light is a predominantly reflected polarization of incident light. The first side $10_f$ of the WGP 10, 30, or 40 is a side of the WGP 10, 30, or 40 on which the array of wires 15 is located. The second side $10_s$ of the WGP 10, 30, or 40 is opposite of the first side $10_f$ of the WGP 10, 30, or 40 and is a side of the WGP 10, 30, or 40 on which the transparent substrate 17 is located.

To improve Rs1 and Rs2, there can be a relationship between the indices of refraction of the transparent layers 11-14. An index of refraction of the first transparent layer (n1) can be greater than an index of refraction of the second transparent layer (n2) and/or an index of refraction of the fourth transparent layer (n4) can be greater than an index of refraction of the third transparent layer (n3). The index of refraction of the first transparent layer (n1) can be close to or the same as the index of refraction of the fourth transparent layer (n4). The index of refraction of the second transparent layer (n2) can be close to or the same as the index of refraction of the third transparent layer (n3). For example, there can be one or more of the following relationships between the indices: n1>n2, n1−n2>0.1, n1−n2>0.2, n1−n2>0.5, n1−n2>1; n4>n3, n4−n3>0.1, n4−n3>0.2, n4−n3>0.5, n4−n3>1; n1=n4, |n1−n4|<0.2, |n1−n4|<0.1; n2=n3, |n2−n3|<0.2, |n2−n3|<0.1.

To improve Rs1 and Rs2, it can be beneficial for n1 and n4 to have high indices of refraction and for n2 and n3 to have low indices of refraction. For example, the indices of refraction can have one or more of the following values: n1>2.0, n1>1.65, n4>2.0, n4>1.65, n2<1.55, n3<1.55.

Figure 4:
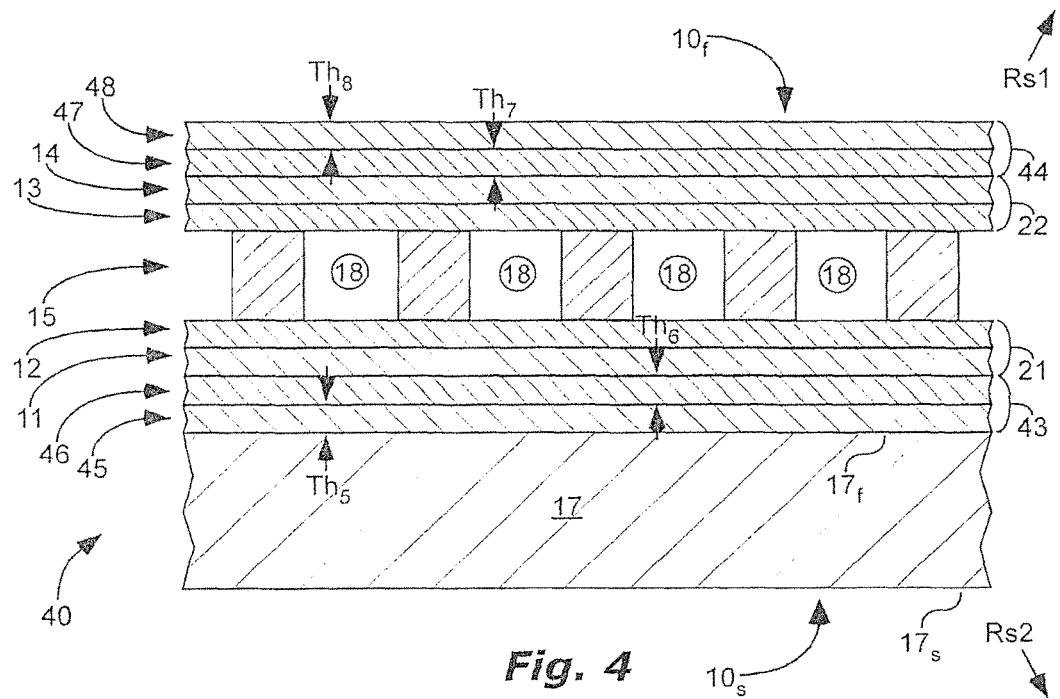

WGP 40, shown in FIG. 4, can have characteristics of WGPs 10 and 30 described above, and also the following characteristics. WGP 40 can have improved Rs1 and Rs2 by including additional pairs of layers 43 and 44 with alternating high and low index of refraction.

A third pair of thin-film layers 43 can be located between the first pair of thin-film layers 21 and the transparent substrate 17. The third pair of thin-film layers 43 can be continuous (i.e. not divided into a grid like the wires 15) and can span the channels 18. The third pair of thin-film layers 43 can include a fifth transparent layer 45, with an index of refraction n5, and a sixth transparent layer 46, with an index of refraction n6. The fifth transparent layer 45 can be located closer to the transparent substrate 17 than the sixth transparent layer 46.

A fourth pair of thin-film layers 44 can be located at an opposite side of the array of wires 15 from the transparent substrate 17, and farther from the array of wires than the second pair of thin-film layers 22. The fourth pair of thin-film layers 44 can be continuous and can span the channels 18. The fourth pair of thin-film layers 44 can include a seventh transparent layer 47, with an index of refraction n7, and an eighth transparent layer 48, with an index of refraction n8. The seventh transparent layer 47 can be located closer to the array of wires 15 than the eighth transparent layer 48.

Following are possible relationships between and values of the indices of refraction of these additional layers 45, 46, 47, and 48: n5>n6; n8>n7; n5−n6>0.1, n5−n6>0.2, n5−n6>0.5, n5−n6>1; n8−n7>0.1, n8−n7>0.2, n8−n7>0.5, n8−n7>1; n5=n8, |n5−n8|<0.2, |n5−n8|<0.1; n6=n7, |n6−n7|<0.2, |n6−n7|<0.1; n5>2.0, n5>1.65, n8>2.0, n8>1.65, n6<1.55, n7<1.55. There can be additional pairs of high and low index of refraction layers in the stack of layers beyond those shown, and these additional layers can have similar relationships between the indices of refraction. Although WGP 40 may have improved performance over WGPs 10 and 30, the added layers 45-48 can increase manufacturing cost. Therefore, a choice between WGPs 10 and 30 and WGP 40 can be based on cost and needed performance.

Depending on the application, it can be beneficial to have a small difference between Rs1 and Rs2. For example: |Rs1−Rs2|<0.5% in one aspect, |Rs1−Rs2|<1% in another aspect, |Rs1−Rs2|<2% in another aspect, |Rs1−Rs2|<3% in another aspect, or |Rs1−Rs2|<5% in another aspect. One way to achieve this low difference between Rs1 and Rs2 is to have a mirror image of transparent materials on both sides of the wires 15.

Thus, a material composition of the first transparent layer 11 can be the same as a material composition of the fourth transparent layer 14. Also, a material composition of the second transparent layer 12 can be the same as a material composition of the third transparent layer 13, but different from the material composition of the first transparent layer 11 and the fourth transparent layer 14. For WGP 40, there can also be the same material composition of the fifth transparent layer 45 with the eighth transparent layer 48 and the sixth transparent layer 46 with the seventh transparent layer 47.

One example of material composition is that one or more of the first transparent layer 11, the fourth transparent layer 14, the fifth transparent layer 45, and the eighth transparent layer 48 can be or can include titanium dioxide.

Another example of material composition is that one or more of the second transparent layer 12, the third transparent layer 13, the sixth transparent layer 46, and the seventh transparent layer 47 can be or can include silicon dioxide. Due to imperfections in deposition of materials of the transparent layers 11-14 and 45-48, these chemical formulas are not necessarily in exact stoichiometric ratios. For example, the term "titanium dioxide" means approximately one titanium atom for every two oxygen atoms, such as for example $Ti_xO_y$, where $0.9 \le x \le 1.1$ and $1.9 \le y \le 2.1$. As another example, silicon dioxide generally refers to $SiO_2$, but as used herein, the term silicon dioxide means approximately one silicon atom for every two oxygen atoms, such as for example $Si_vO_z$, where $0.9 \le v \le 1.1$ and $1.9 \le z \le 2.1$.

Although materials of composition of the first transparent layer 11 and the fourth transparent layer 14 may be equal, and materials of composition of the second transparent layer 12 and the third transparent layer 13 may be equal, thicknesses of the equivalent layers may need to be different to equalize Rs1 and Rs2, because of potentially different materials at one side of the WGP relative to an opposite side. For example, the first transparent layer 11 might be adjacent to glass and the fourth transparent layer 14 might be adjacent to air.

Figure 3:
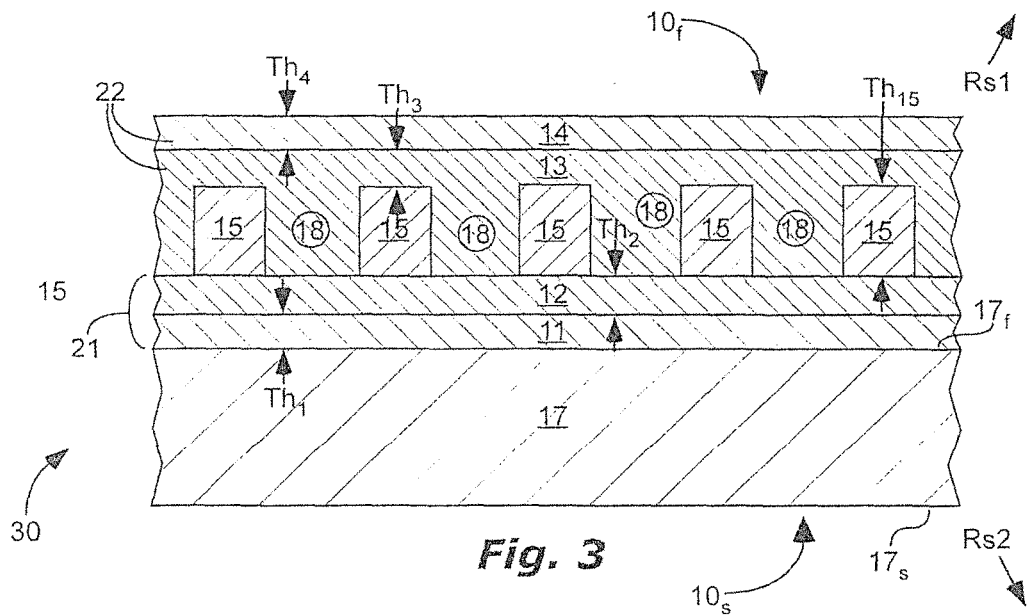
Figure 5:
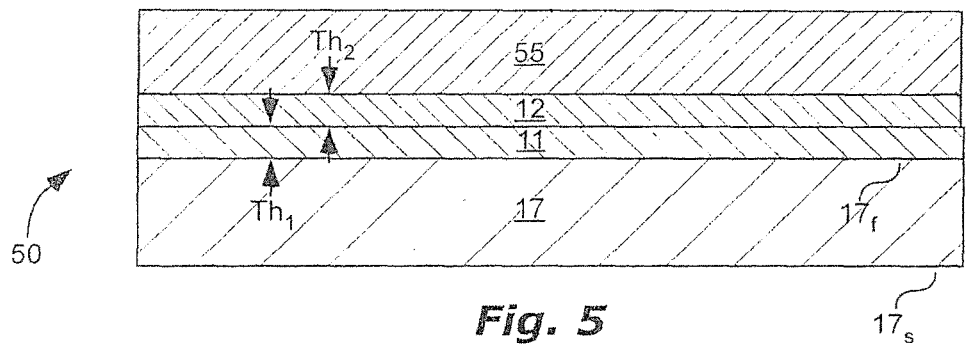
FIGS. 5-6 are schematic, cross-sectional side-views showing steps 50 and 60 in manufacture of a WGP, in accordance with an embodiment of the present invention.
Figure 6:
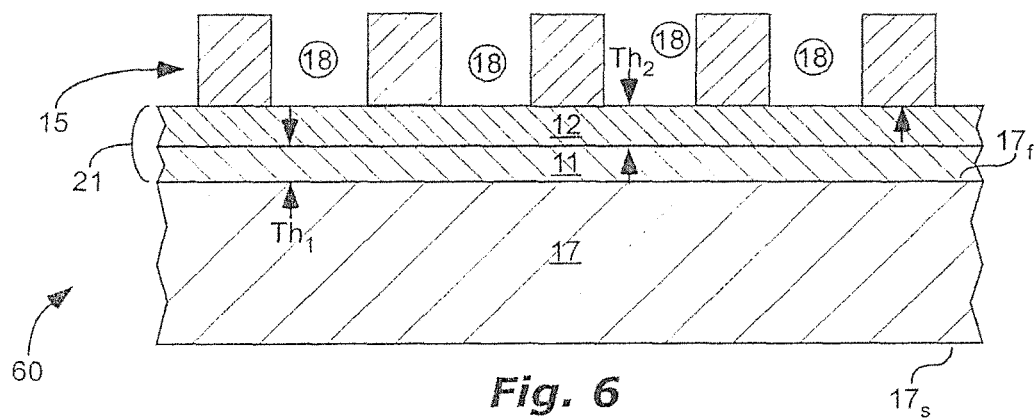

The following method can be followed to achieve equal or nearly equal Rs1 and Rs2 even if there are different materials at one end of the side (e.g. glass substrate) relative to an opposite side (e.g. air). The following method of manufacturing a WGP 10, 30, or 40 can comprise the following steps in the order of step a), step b), step c), then step d):

a) calculating the following for |Rs1−Rs2|<1%:
   a thickness of the first transparent layer, defining a first thickness $Th_1$;
   a thickness of the second transparent layer, defining a second thickness $Th_2$;

a thickness of the third transparent layer, defining a third thickness $Th_3$; and
a thickness of the fourth transparent layer, defining a fourth thickness $Th_4$;

b) depositing the following in the following order (see FIG. 5):
the first transparent layer 11 with the first thickness $Th_1$;
the second transparent layer 12 with the second thickness $Th_2$; and
material of the array of wires 55;

c) etching the material of the array of wires 55 to form the array of wires 15 (see FIG. 6);

d) depositing the following in the following order:
the third transparent layer 13 with the third thickness $Th_3$ (without filling the channels 18 for WGP 10 or filling the channels 18 for WGP 30); and
the fourth transparent layer 14 with the fourth thickness $Th_4$ (see FIGS. 1 & 3).

Thicknesses of each layer $Th_1$, $Th_2$, $Th_3$, $Th_4$, $Th_5$, $Th_6$, $Th_7$, $Th_8$, and $Th_r$ can be smaller than a smallest wavelength in a wavelength range of desired polarization, and each thickness can be less than 400 nm. If the WGP 10, 30, or 40 is sandwiched between prisms to form a cube 50, then the following thickness relationships, along with a mirror image of materials, can equalize Rs1 and Rs2: $Th_8=Th_5$, $Th_7=Th_6$, $Th_4=Th_1$, and $Th_3=Th_2$. Examples of thicknesses: $Th_2$ of the second transparent layer 12, $Th_3$ of the third transparent layer 13, $Th_6$ of the sixth transparent layer 46, and $Th_7$ of the seventh transparent layer 47 can be: =80 nm; >40 nm or >60 nm; and <110 nm or <150 nm. $Th_1$ of the first transparent layer 11, $Th_4$ of the fourth transparent layer 14, $Th_5$ of the fifth transparent layer 45, and $Th_8$ of the eighth transparent layer 48 can be: =50 nm; >10 nm or >30 nm; and <80 nm or <110 nm.

Figure 7:
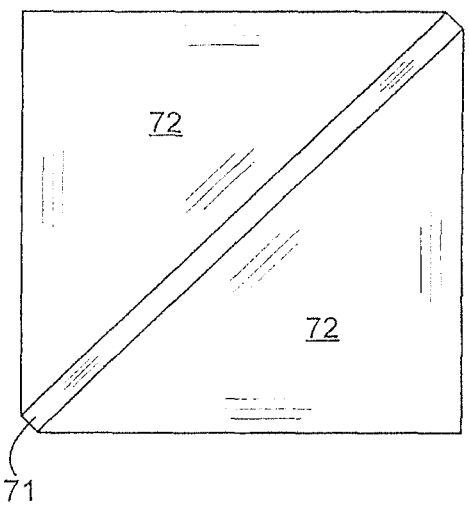
FIG. 7 is a schematic end-view of a cube polarizing beam splitter 70, including WGP 71, which can be WGP 10, 30, or 40, sandwiched between two prisms 72, in accordance with an embodiment of the present invention.

As shown in FIG. 7, the WGPs 10, 30, or 40 described above, shown in FIG. 7 as WGP 71, can be sandwiched between a pair of prisms 72, forming a cube polarizing beam splitter 70.

What is claimed is:

1. A wire grid polarizer (WGP) comprising:
a transparent substrate having a first side, and a second side opposite of the first side;
an array of wires located over the first side of the transparent substrate with channels between adjacent wires;
a first pair of thin-film layers: located between the array of wires and the transparent substrate; being continuous and spanning the channels; and including a first transparent layer located closer to the transparent substrate and a second transparent layer located closer to the array of wires;
a second pair of thin-film layers: located at an opposite side of the array of wires from the transparent substrate; being continuous and spanning the channels; and including a third transparent layer located closer to the array of wires and a fourth transparent layer located farther from the array of wires;
a material composition of the first transparent layer being the same as a material composition of the fourth transparent layer; and
a material composition of the second transparent layer being the same as a material composition of the third transparent layer, but different from the material composition of the first transparent layer and the fourth transparent layer.

2. The WGP of claim 1, wherein
the material composition of the first transparent layer and the material composition of the fourth transparent layer include titanium dioxide; and
the material composition of the second transparent layer and the material composition of the third transparent layer include silicon dioxide.

3. The WGP of claim 1, wherein for a wavelength range of at least 100 nm in a visible spectrum of light, Rs1>93% and Rs2>93%, where: Rs1 is a percent reflection of s-polarized light from a first side of the WGP; Rs2 is a percent reflection of s-polarized light from a second side of the WGP; s-polarized light is a predominantly reflected polarization of incident light; the first side of the WGP is a side of the WGP on which the array of wires is located; and the second side of the WGP is opposite of the first side of the WGP and is a side of the WGP on which the transparent substrate is located.

4. The WGP of claim 3, wherein for the wavelength range of at least 100 nm in the visible spectrum of light: |Rs1−Rs2|<2%.

5. The WGP of claim 1, wherein the third transparent layer extends into and fills at least 80% of the channels.

6. A method of manufacturing the WGP of claim 1, the method comprising the following steps in the following order:
calculating a thickness of the first transparent layer, defining a first thickness; a thickness of the second transparent layer, defining a second thickness; a thickness of the third transparent layer, defining a third thickness; and a thickness of the fourth transparent layer, defining a fourth thickness; for |Rs1−Rs2|<1%, where: Rs1 is a percent reflection of s-polarized light from a first side of the WGP; Rs2 is a percent reflection of s-polarized light from a second side of the WGP; s-polarized light is a predominantly reflected polarization of incident light; the first side of the WGP is a side of the WGP on which the array of wires is located; and the second side of the WGP is opposite of the first side of the WGP and is a side of the WGP on which the transparent substrate is located:
depositing the following in the following order: the first transparent layer with the first thickness; the second transparent layer with the second thickness; then material of the array of wires;
etching the material of the array of wires to form the array of wires;
depositing the following in the following order: the third transparent layer with the third thickness; then the fourth transparent layer with the fourth thickness.

7. The WGP of claim 1, further comprising:
a third pair of thin-film layers: located between the first pair of thin-film layers and the transparent substrate; being continuous and spanning the channels; and including a fifth transparent layer and a sixth transparent layer with the fifth transparent layer located closer to the transparent substrate than the sixth transparent layer;
a fourth pair of thin-film layers: located at an opposite side of the array of wires from the transparent substrate and farther from the array of wires than the second pair of thin-film layers; being continuous and spanning the channels; and including a seventh transparent layer and an eighth transparent layer with the seventh transparent layer located closer to the array of wires than the eighth transparent layer; and
for the wavelength range of at least 100 nm in the visible spectrum of light: an index of refraction of the fifth transparent layer is greater than an index of refraction of the sixth transparent layer; and an index of refraction of the eighth transparent layer is greater than an index of refraction of the seventh transparent layer.

8. A wire grid polarizer (WGP) comprising:
a transparent substrate having a first side, and a second side opposite of the first side;
an array of wires located over the first side of the transparent substrate with channels between adjacent wires;
a first pair of thin-film layers: located between the array of wires and the transparent substrate; being continuous and spanning the channels; and including a first transparent layer located closer to the transparent substrate and a second transparent layer located closer to the array of wires;
a second pair of thin-film layers: located at an opposite side of the array of wires from the transparent substrate; being continuous and spanning the channels; and including a third transparent layer located closer to the array of wires and a fourth transparent layer located farther from the array of wires;
for a wavelength range of at least 100 nm in a visible spectrum of light, Rs1>93% and Rs2>93%, where: Rs1 is a percent reflection of s-polarized light from a first side of the WGP; Rs2 is a percent reflection of s-polarized light from a second side of the WGP; s-polarized light is a predominantly reflected polarization of incident light; the first side of the WGP is a side of the WGP on which the array of wires is located; and the second side of the WGP is opposite of the first side of the WGP and is a side of the WGP on which the transparent substrate is located.

9. The WGP of claim 8, wherein for the wavelength range of at least 100 nm in the visible spectrum of light, Rs1 and Rs2 are both greater than 95%.

10. The WGP of claim 8, wherein for the wavelength range of at least 100 nm in the visible spectrum of light: |Rs1−Rs2|<2%.

11. The WGP of claim 8, further comprising a pair of prisms, the WGP being sandwiched between the pair of prisms, forming a cube polarizing beam splitter (cube PBS).

12. The WGP of claim 8, wherein the first transparent layer adjoins the second transparent layer, the wires adjoin the third transparent layer and the second transparent layer, and the fourth transparent layer adjoins the third transparent layer.

13. The WGP of claim 8, further comprising:
a third pair of thin-film layers: located between the first pair of thin-film layers and the transparent substrate; being continuous and spanning the channels; and including a fifth transparent layer and a sixth transparent layer with the fifth transparent layer located closer to the transparent substrate than the sixth transparent layer;
a fourth pair of thin-film layers: located at an opposite side of the array of wires from the transparent substrate and farther from the array of wires than the second pair of thin-film layers; being continuous and spanning the channels; and including a seventh transparent layer and an eighth transparent layer with the seventh transparent layer located closer to the array of wires than the eighth transparent layer; and
for the wavelength range of at least 100 nm in the visible spectrum of light: an index of refraction of the fifth transparent layer is greater than an index of refraction of the sixth transparent layer; and an index of refraction of the eighth transparent layer is greater than an index of refraction of the seventh transparent layer.

14. A wire grid polarizer (WGP) comprising:
a transparent substrate having a first side, and a second side opposite of the first side;
an array of wires located over the first side of the transparent substrate with channels between adjacent wires;
a first pair of thin-film layers: located between the array of wires and the transparent substrate; being continuous and spanning the channels; and including a first transparent layer located closer to the transparent substrate and a second transparent layer located closer to the array of wires;
a second pair of thin-film layers: located at an opposite side of the array of wires from the transparent substrate; being continuous and spanning the channels; and including a third transparent layer located closer to the array of wires and a fourth transparent layer located farther from the array of wires;
the third transparent layer extends into and fills at least 80% of the channels;
for a wavelength range of at least 100 nm in a visible spectrum of light: an index of refraction of the first transparent layer (n1) is greater than an index of refraction of the second transparent layer (n2); and an index of refraction of the fourth transparent layer (n4) is greater than an index of refraction of the third transparent layer (n3); and
a material composition of the second transparent layer is the same as a material composition of the third transparent layer, but different from the material composition of the first transparent layer and the fourth transparent layer.

15. The WGP of claim 14, further comprising:
a third pair of thin-film layers: located between the first pair of thin-film layers and the transparent substrate; being continuous and spanning the channels; and including a fifth transparent layer and a sixth transparent layer with the fifth transparent layer located closer to the transparent substrate than the sixth transparent layer;
a fourth pair of thin-film layers: located at an opposite side of the array of wires from the transparent substrate and farther from the array of wires than the second pair of thin-film layers; being continuous and spanning the channels; and including a seventh transparent layer and an eighth transparent layer with the seventh transparent layer located closer to the array of wires than the eighth transparent layer; and
for the wavelength range of at least 100 nm in the visible spectrum of light: an index of refraction of the fifth transparent layer is greater than an index of refraction of the sixth transparent layer; and an index of refraction of the eighth transparent layer is greater than an index of refraction of the seventh transparent layer.

16. The WGP of claim 14, wherein for the wavelength range of at least 100 nm in the visible spectrum of light: n1−n2>0.5 and n4−n3>0.5.

17. The WGP of claim 14, wherein for the wavelength range of at least 100 nm in the visible spectrum of light: n1>2.0, n4>2.0, n2<1.55, and n3<1.55.

18. The WGP of claim 14, wherein the third transparent layer fills at least 99% of the channels 18.

19. The WGP of claim 14, wherein for the wavelength range of at least 100 nm in the visible spectrum of light, Rs1>93% and Rs2>93%, where: Rs1 is a percent reflection of s-polarized light from a first side of the WGP; Rs2 is a percent reflection of s-polarized light from a second side of the WGP; s-polarized light is a predominantly reflected polarization of incident light; the first side of the WGP is a side of the WGP on which the array of wires is located; and the second side of the WGP is opposite of the first side of the WGP and is a side of the WGP on which the transparent substrate is located.

20. The WGP of claim 14, further comprising a pair of prisms, the WGP being sandwiched between the pair of prisms, forming a cube polarizing beam splitter (cube PBS).

* * * * *